US011934188B2

(12) United States Patent
Kleen et al.

(10) Patent No.: US 11,934,188 B2
(45) Date of Patent: Mar. 19, 2024

(54) MONITORING AND PLANNING A MOVEMENT OF A TRANSPORTATION DEVICE

(71) Applicant: Volkswagen Aktiengesellschaft, Wolfsburg (DE)

(72) Inventors: Andro Kleen, Braunschweig (DE); Johannes Tümler, Wellen (DE); Adrian Haar, Hannover (DE); Robert Jan Wyszka, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 569 days.

(21) Appl. No.: 17/270,007

(22) PCT Filed: Aug. 8, 2019

(86) PCT No.: PCT/EP2019/071279
§ 371 (c)(1),
(2) Date: Feb. 20, 2021

(87) PCT Pub. No.: WO2020/048718
PCT Pub. Date: Mar. 12, 2020

(65) Prior Publication Data
US 2021/0311472 A1    Oct. 7, 2021

(30) Foreign Application Priority Data
Sep. 6, 2018    (DE) .................... 10 2018 215 186.5

(51) Int. Cl.
*G05D 1/00*    (2006.01)
*G06F 3/04815*    (2022.01)
(Continued)

(52) U.S. Cl.
CPC ......... *G05D 1/0038* (2013.01); *G05D 1/0016* (2013.01); *G05D 1/0212* (2013.01);
(Continued)

(58) Field of Classification Search
CPC .. G05D 1/0038; G05D 1/0016; G05D 1/0212; G05D 2201/0213; G06F 3/04815;
(Continued)

(56) References Cited

U.S. PATENT DOCUMENTS 9,494,935 B2    11/2016    Okumura et al.
10,338,598 B2    7/2019    Altinger et al.
(Continued)

FOREIGN PATENT DOCUMENTS

CN    105955290 A    9/2016    ............... G05D 1/10
CN    106794874 A    5/2017    ............. B62D 15/02
(Continued)

OTHER PUBLICATIONS

WO 2017061035 A1 with English translation. (Year: 2017).*
(Continued)

*Primary Examiner* — Calvin Cheung
(74) *Attorney, Agent, or Firm* — Slayden Grubert Beard PLLC

(57) ABSTRACT

The invention relates to a method, to a device, and to a computer-readable storage medium with instructions for monitoring the movement of a transportation device. In one embodiment, first, information about the trajectory of the transportation device is received by a mobile device. The trajectory is then displayed on a display unit of the mobile device in the form of an augmented reality representation. In response thereto, an input of the user of the mobile device for influencing the trajectory is detected. Finally, information is transmitted to the transportation device on the basis of the input of the user.

17 Claims, 11 Drawing Sheets

(51) Int. Cl.
*G06F 3/0488* (2022.01)
*G06T 19/00* (2011.01)

(52) U.S. Cl.
CPC ........ *G06F 3/04815* (2013.01); *G06F 3/0488* (2013.01); *G06T 19/006* (2013.01)

(58) Field of Classification Search
CPC ....... G06F 3/0488; G06T 19/006; B62D 1/00; B62D 15/0285
See application file for complete search history.

(56) References Cited

U.S. PATENT DOCUMENTS

| | | | |
|---|---|---|---|
| 10,488,215 B1* | 11/2019 | Yu | G01C 21/365 |
| 10,800,405 B2 | 10/2020 | Marcial-simo | |
| 10,807,641 B2 | 10/2020 | Gehin | |
| 10,996,666 B2 | 5/2021 | Li et al. | |
| 2013/0286206 A1* | 10/2013 | Ozaki | G06T 19/006 348/148 |
| 2014/0278053 A1* | 9/2014 | Wu | G01C 21/3438 701/408 |
| 2015/0062168 A1* | 3/2015 | Ng-Thow-Hing | G02B 27/0101 345/633 |
| 2015/0116358 A1* | 4/2015 | Choi | G06T 19/006 345/633 |
| 2015/0149088 A1 | 5/2015 | Attard et al. | 701/538 |
| 2015/0204687 A1* | 7/2015 | Yoon | G06T 19/006 701/436 |
| 2015/0379777 A1* | 12/2015 | Sasaki | G02B 27/0176 345/633 |
| 2017/0193705 A1* | 7/2017 | Mullins | G06T 19/20 |

FOREIGN PATENT DOCUMENTS

| | | | |
|---|---|---|---|
| CN | 107515606 A | 12/2017 | G05D 1/02 |
| CN | 108025766 A | 5/2018 | B62D 15/02 |
| CN | 108137096 A | 6/2018 | B62D 15/02 |
| DE | 102012208288 A1 | 11/2013 | B60W 30/06 |
| DE | 102012222972 A1 | 6/2014 | B60W 30/06 |
| DE | 102013213039 A1 | 1/2015 | B60W 30/00 |
| DE | 102015118489 A1 | 5/2016 | B60W 50/00 |
| DE | 102014018108 A1 | 6/2016 | B60W 30/06 |
| DE | 102016013696 A1 | 5/2017 | G08G 1/14 |
| DE | 102016208373 A1 | 11/2017 | B60W 30/06 |
| DE | 102016009700 A1 | 2/2018 | B60R 16/02 |
| DE | 102016221106 A1 | 4/2018 | B60W 30/06 |
| DE | 102018215186 A1 | 3/2020 | B60R 16/02 |
| EP | 2672354 A1 | 12/2013 | B60R 21/00 |
| EP | 3072710 A1 | 9/2016 | B60D 1/30 |
| WO | WO-2011100535 A1 * | 8/2011 | G01C 21/3602 |
| WO | WO-2017053616 A1 * | 3/2017 | B60K 35/00 |
| WO | 2017/071143 A1 | 5/2017 | G05D 1/12 |
| WO | 2020/048718 A1 | 3/2020 | B62D 15/02 |

OTHER PUBLICATIONS

WO 2015182290 A1 with English translation. (Year: 2015).*
International Search Report and Written Opinion, Application No. PCT/EP2019/071279, 10 pages, dated Nov. 20, 2019.
German Office Action, Application No. 102018215186.5, 8 pages, dated Jan. 8, 2020.

* cited by examiner

MONITORING AND PLANNING A MOVEMENT OF A TRANSPORTATION DEVICE

CROSS-REFERENCE TO RELATED APPLICATIONS

This application claims priority to German Patent Application No. DE 10 2018 215 186.5, filed on Sep. 6, 2018 with the German Patent and Trademark Office. The contents of the aforesaid Patent Application are incorporated herein for all purposes.

TECHNICAL FIELD

The present invention relates to a method, an apparatus and a computer readable storage medium with instructions for monitoring a movement of a transportation device. The invention further relates to a method, a device and a computer readable storage medium with instructions for planning a movement of a transportation device, as well as a transportation device using such a method or such a device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

For years, there can be seen an increasing spread of digital technologies in society. It is to be expected that this digitization of society will increase significantly in the everyday life. Virtual reality and augmented reality technologies and applications represent a special form of digitization. Augmented Reality (AR) is the enrichment of the real world with virtual elements, which regarding location are correctly registered in the three-dimensional space and allow real-time interaction. Synonymously, the term "mixed reality" is used. For the display of AR representations for example augmented reality glasses can be used. Augmented reality glasses are worn like normal glasses, but comprise one or more projection units or displays, with the help of which information can be projected in front of the eyes or directly onto the retina of the wearer of the glasses. The glasses are designed in such a manner that the wearer can also realize the environment. An increasing acceptance of this devices may be expected due to new technologies for augmented reality glasses, for example light field technology, advances in battery technology as well as the entry of large companies into this.

Alternatively, AR displays can also be generated by using augmented reality smartphones or augmented reality tablets. Thereby, virtual elements and the environment recorded by a camera of the respective device are together displayed on the display of the respective device. A projection of contents into the real environment is also possible.

Overall, it is foreseeable that augmented reality glasses, augmented reality smartphones, and other augmented reality devices will be increasingly being used by end customers. It can be expected that in the future this sector will offer powerful options, for example for providing user interfaces based on augmented reality representations in the automotive sector as the providers of the market-leading operating systems are currently making great efforts to establish their development environments and functions for augmented reality applications. One possible application of such user interfaces are movement maneuvers of a transportation device. A situation is considered in which the driver or another person is outside a vehicle that is currently performing a maneuver. For example, this relates to scenarios of use in which the vehicle carries out automatic parking maneuvers or, after the handover in corresponding zones, performs automated valet parking journeys. In the manual area the focus is on scenarios, which include manual parking or maneuvering.

SUMMARY

An object exists to provide an improved monitoring and planning of a movement of a transportation device.

The object is achieved by a method, by a device, and by a transportation device according to the independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

Figure 1:
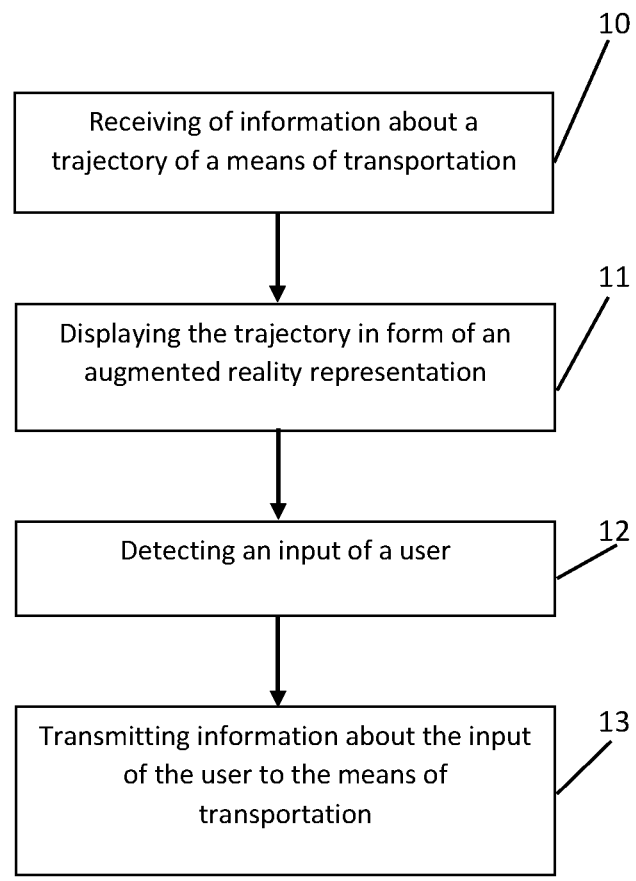
FIG. 1 schematically shows an exemplary method for monitoring a movement of a transportation device.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for monitoring a movement of a transportation device may comprise the steps:

Receiving of information about a trajectory of the transportation device;

Displaying the trajectory on a display unit of a mobile device in form of an augmented reality representation;

Detecting an input of a user of the mobile device for influencing the trajectory; and Transmitting information to the transportation device on basis of the input of the user.

Correspondingly, a computer-readable storage medium may contain instructions which when carried out by a computer allow the computer to perform the following steps for monitoring the movement of a transportation device:

Receiving information about a trajectory of the transportation device;

Displaying the trajectory on a display unit of a mobile device in the form of an augmented reality representation;

Detecting an input of a user of the mobile device for influencing the trajectory; and Transmitting information to the transportation device based on the input of the user.

The term computer should be understood broadly. For example, it also includes mobile processor-based data processing devices.

Analogously, a device for monitoring a movement of a transportation device may comprise:

a receiving unit for receiving information about a trajectory of the transportation device;

a graphics unit for generating a representation of the trajectory on a display unit of a mobile device in the form of an augmented reality representation;

a user interface detecting an input of a user of the mobile device for influencing the trajectory; and a transmission unit for transmitting information to the transportation device based on the input of the user.

In a second exemplary aspect, a method for planning a movement of a transportation device may comprise the steps:

Transmitting information about a trajectory of the transportation device to a mobile device;

Receiving information for influencing the trajectory from the mobile device based on an input of a user of the mobile device; and Planning the movement of the transportation device based on at least the received information.

Correspondingly, a computer-readable storage medium may contain instructions which when carried out by a computer allow the computer to perform the following steps for planning a movement of a transportation device:

Transmitting information about a trajectory of the transportation device to a mobile device;

Receiving information for influencing the trajectory from the mobile device based on an input of a user of the mobile device; and Planning the movement of the transportation device based on at least the received information.

The term computer should be understood broadly. For example, it also includes control devices in vehicles.

Analogously to this, a device for planning a movement of a transportation device may comprise:

a transmission unit for transmitting information about a trajectory of the transportation device to a mobile device;

a receiving unit for receiving information for influencing the trajectory from the mobile device based on an input of a user of the mobile device; and a movement planner for planning the movement of the transportation device based on at least the information received.

The solution of the teachings herein is based on the idea that information about the current and planned trajectory based on a current position may be transmitted from a transportation device to a mobile device and can be displayed by means of augmentations, for example by using a camera function of the mobile device. For example, wireless transmission paths such as Wi-Fi or Bluetooth may be used for transmission. In this manner, an outside positioned person, for example the driver of a vehicle, may point the camera of his smartphone at the vehicle and is then able to see augmented displays of the planned driving path on the display of his smartphone. Alternatively, he may view the vehicle through his augmented reality glasses, which then generate the necessary augmentations. In contrast to known approaches, where the user can only start or stop a movement of the vehicle, the user now may actively influence the trajectory of the transportation device. In this manner, the user is able to react on potentially dangerous situations and has greater control over the movement of the transportation device. In the automotive sector the teachings described are helpful for both classic car applications as well as for usage scenarios with heavy, for example multi-axle, commercial vehicles with particularly high requirements for shunting operations. The solution beneficially may be used also for movement systems for caravans, which may be controlled for example by means of a remote control.

In some embodiments, the mobile device receives information about obstacles detected by a sensor system of the transportation device and shows them on the display unit. By the augmented reality representation, it may also be visualized whether the transportation device did correctly recognize certain static or dynamic obstacles in the environment, for example concrete pillars, the supports of a carport or people. For example, at initial operations fear may be taken from the user, especially from the inexperienced users, that the transportation device is self-damaged, for example due to sensor errors.

In some embodiments, the user's input determines a destination for the transportation device, a path for the transportation device, or information about an obstacle. For example, the use of a touch-sensitive displays qualifies for this. A target point or an obstacle may be determined for example by simply tapping the display at the appropriate position. A path in turn may be determined by drawing the path on the display with a finger. The inputs mentioned may thus be made in very intuitive and particularly easy manner. Additionally, dedicated control surfaces may be provided, for example for starting or stopping the movement. The function of a dead man's button may also be implemented via such a control surface.

In some embodiments, the user marks an obstacle on the display unit or classifies a marked obstacle. For example, the user may tap or encircle an obstacle on a touch-sensitive display. Unless the marked element is not automatically recognized after manual marking, an assignment of meaning may be made possible. For this purpose, the user may use for example a drop-down menu, in which different classifications are available. This may be location-based classifications such as "obstacle on the ground", "vertical obstacle", or "dynamic object". However, more precise classifications are also possible, such as "pothole", "person" or "wall". The user may thus easily add or correct obstacles that are not or incorrectly recognized by the sensor system. This information may also be used to improve the data situation on the part of the perception of the environment of the transportation device.

In some embodiments, the transportation device receives environmental information or information from other sources captured by the mobile device and takes them into account in planning the movement. A possibility to effectively integrate the mobile device consists in using the camera image of the mobile device as an additional sensor and to provide the contents to the sensor fusion of the transportation device.

Here, e.g., two ways are conceivable. On the one hand, the camera image may be provided to the evaluation units of the transportation device without further information. In this case, the corresponding technical software module may perform an improvement or validation of the own perception of the environment by the on-board algorithms, for example, because distances may be better assigned or because objects may only be discovered through the new perspective.

On the other hand, image processing steps may be executed already on the part of the mobile device or server based. Here, essential processing steps may then be carried out for measurement and detection of the environment, which anyway have to be carried out to display augmented reality representations. The results may then passed on to the modules of the transportation device in aggregated form.

Of course, it is also possible to use the approaches described above in parallel. Since mobile devices are also equipped with microphones, according to the principles described above, acoustic signals may also be provided to the transportation device and may be used to interpret the current situation. As for example tire movements generate characteristic sound patterns on different surfaces, it is for example possible to respond with measures to unexpected noise, such as glass shattering or collision noise. For example, a parking process may be stopped, a trajectory may be changed, or a speed may be reduced, etc.

In some embodiments, a method according to some embodiments or a device according to some embodiments is used for planning a movement in a transportation device. The transportation device for example may be a motor vehicle. However, the solution according to the teachings herein is also useable for other types of transportation devices, such as for example for ships, aircraft, especially when moving on the ground, or automated transport systems.

In the shipping sector, the teachings described enable better forecasting of the movements and positions of ships, both in manual and in automatic operation. In this manner local pilots, but also the crew and the passengers of a ship, with the help of their mobile device may recognize and predict the effects of the current rudder angle (course) and machine power (speed) related to the actual fairway and the rest of the environment.

As for the maritime sector, the teachings presented are also highly relevant in the field of air travel. On the one hand, deployments by pilots are conceivable here, in which especially on the ground (taxiing from the gate to the runway or from the runway to the gate) optical orientation may be given for the correct path. On the other hand, a mobile device may also be used by the ground staff, for example by a park guide or the airfield surveillance, to display the current trajectory of an aircraft. For example, the marshaller would point a mobile device at an aircraft and thereby see the current trajectory and possibly also the continuing path to the finish gate.

The same principle may also be applied to rail and bus transport. In this case also, the users may be on the one hand the customers, but on the other hand also the rail or railroad staff standing on the bus platform. In this case also, the goal is to understand, to predict and, if desired, to control the movement and the purpose of another vehicle.

Another case of use is the use in an automated container terminal, where automated lifting vehicles are used and may be monitored. In such a manner, the security in dealing with such heavy-duty vehicles may be increased significantly.

Another use case is the use by driving schools. Here, driving inputs of a student may be translated into a future augmented reality trajectory. On the one hand this information may then be used by the driving instructor for giving feedback. However, for the student himself a recording may also be relevant later as a base for feedback.

Further features of the present invention will become apparent from the following description and the appended claims in connection with the FIGS.

For a better understanding of the principles of the present invention, the following embodiments are explained in more detail with reference to the FIGS. Of course, the invention is not limited to these embodiments and the features described may also be combined or modified without leaving the scope of the invention as defined in the appended claims.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 schematically shows a method for monitoring a movement of a transportation device. First, information about a trajectory of the transportation device are received from a mobile device 10.

Further, information about obstacles may be received, that have been detected by a sensor system of the transportation device. The trajectory and possibly the detected obstacles are then displayed 11 on a display unit of the mobile device in the form of an augmented reality representation. Thereupon, an input of a user of the mobile device for influencing the trajectory is recorded 12. For example, the input of the user may determine a point of destination for the transportation device, a path for the transportation device or an information about an obstacle. To do so, for example, the user marks an obstacle on the display unit or classifies a marked obstacle. Finally, based on the user's input information is transmitted 13 to the transportation device. In doing so, additional information about the environment detected by the mobile device may be transmitted to the transportation device.

Figure 2:
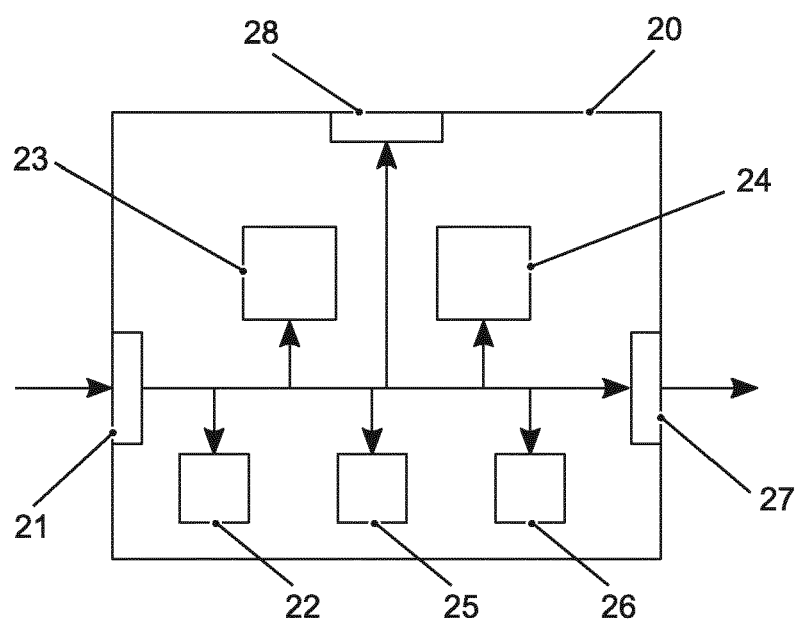
FIG. 2 schematically shows a first embodiment of a device for monitoring movement of a transportation device.

FIG. 2 schematically shows a first embodiment of a device 20 for monitoring a movement of a transportation device. The device 20 has an input 21, by which a receiving unit 22 receives, for example, information about a trajectory of the transportation device. In addition, information about obstacles detected by a sensor system of the transportation device may be received. The device 20 further comprises a graphics unit 23 for generating a representation of the trajectory and of the obstacles, that have been recognized, on a display unit of a mobile device 90 in the form of an augmented reality representation. An input of a user for influencing the trajectory may be detected by a user interface 28. The input of the user for example may be a point of destination for the transportation device, a path for the transportation device or information about an obstacle. To do this, the user for example marks an obstacle on the display unit or classifies a marked obstacle. Based on the input of the user a transmission unit 26 transmits via an output 27 of the device 20 information to the transportation device. In addition, information about the environment recorded by the mobile device may be transmitted to the transportation device.

The receiving unit 22, the graphics unit 23 and the transmission unit 26 may be controlled by a control unit 24. Via the user interface 28, settings of the receiving unit 22 may possibly be changed by the graphics unit 23, the transmission unit 26 or the control unit 24. Date accumulating in the device may be stored in a memory 25 of the device 20, if necessary, for example for later evaluation or for use by the components of the device 20. The receiving unit 22, the graphics unit 23, the transmission unit 26 and control unit 24 may be implemented as dedicated hardware, for example as integrated circuits. However, of course they may partially or fully be combined or implemented as software running on a suitable processor, for example on a GPU or a CPU. The input 21 and the output 27 may be implemented as separate interfaces or as a combined bidirectional interface. The device 20 may be a stand-alone component that is connected to the mobile device via a data connection. However, it may also be integrated into the mobile device.

Figure 3:
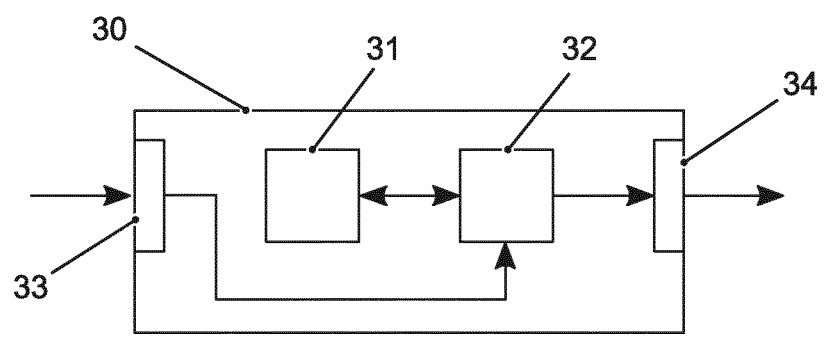
FIG. 3 schematically shows a second embodiment of a device for monitoring movement of a transportation device.

FIG. 3 schematically shows a second embodiment of a device 30 for monitoring a movement of a transportation device. The device 30 comprises a processor 32 and a memory 31. For example, the device is a mobile computing unit, for example in a tablet or in a smartphone. Instructions are stored in the memory 31 that, when executed by the processor 32, cause the device 30 to carry out the steps according to one of the methods described. The instructions stored in the memory 31 thus incorporate a program executable by the processor 32 which implements the method according to the present embodiment. The device 30 comprises an input 33 for receiving information. Data generated by the processor 32 is provided via an output 34. Further, they may be stored in the memory 31. The input 33 and the output 34 may be combined in a bidirectional interface.

The processor 32 may comprise one or more processor units, for example microprocessors, digital signal processors, or combinations thereof.

The memories 25, 31 of the described embodiments may comprise volatile as well as non-volatile storage areas and may comprise a wide variety of storage devices and storage media, for example, hard drives, optical storage media or semiconductor memory.

Figure 4:
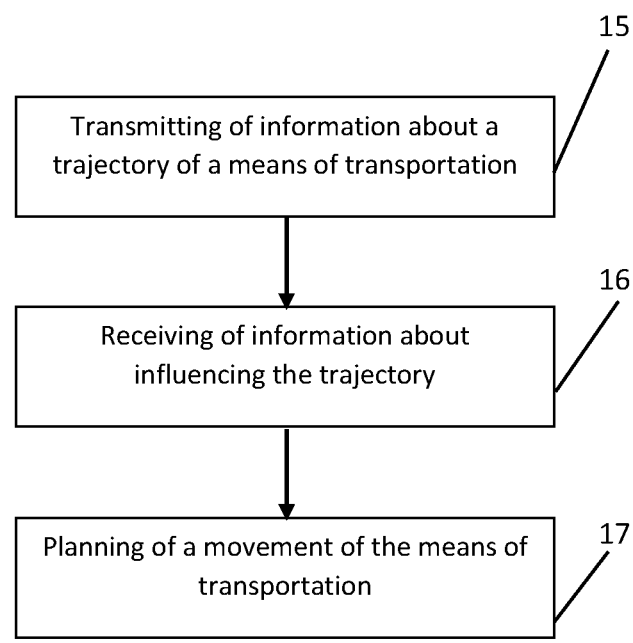
FIG. 4 schematically shows an exemplary method for planning a movement of a transportation device.

FIG. 4 schematically shows a method for planning a movement of a transportation device. First, information about a trajectory of the transportation device is transmitted to a mobile device 15. Additionally, information about obstacles recognized by a sensor system of the transportation device may be transmitted. Then, information transmitted by the mobile device is received 16 for influencing the trajectory based on an input of a user of the mobile device. The input of the user for example may determine a point of destination for the transportation device, a path for the transportation device or information about an obstacle. Finally, the movement of the transportation device is planned 17 based on at least the received information. In addition, the transportation device may receive 16 environmental information detected by the mobile device or information from other sources and take them into account 17 when planning the movement.

Figure 5:
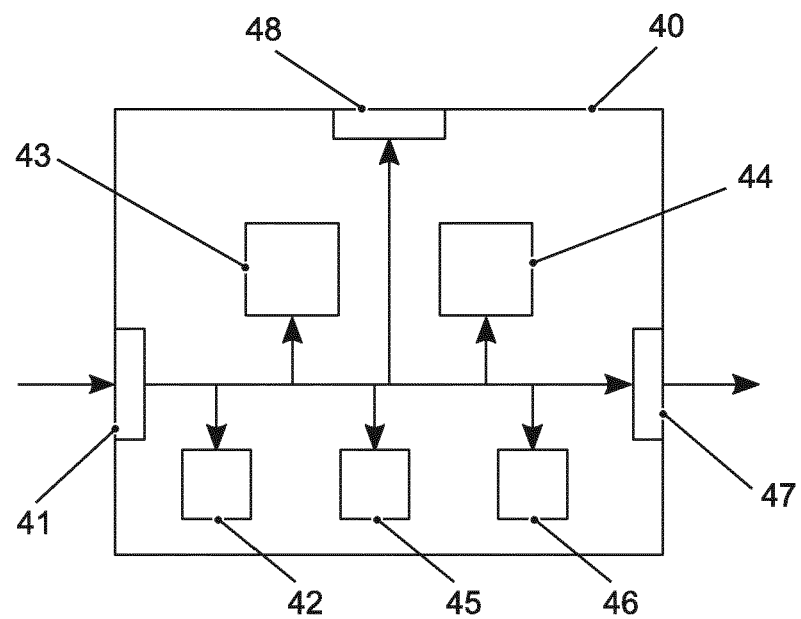
FIG. 5 schematically shows a first embodiment of a device for planning a movement of a transportation device.

FIG. 5 schematically shows a first embodiment of a device 40 for planning a movement of a transportation device. The device 40 has an output 47 via which a communication unit 46 transmits information about a trajectory of the transportation device to a mobile device. Additionally, information about obstacles detected by a sensor system of the transportation device may be transmitted thereby. Via an input 41 of device 40, a receiving unit 42 receives information transmitted by the mobile device for influencing the trajectory based on an input of a user of the mobile device. The input of the user for example may determine a point of destination for the transportation device, a path for the transportation device or information about an obstacle. Based on at least the information received a movement planner 43 plans the movement of the transportation device. Additionally, when planning the movement, the motion planner 43 may consider information captured by the mobile device or information from other sources detected by the mobile device, which were received by the receiving unit 42. The planning data of the movement planner 43 may be output via output 47 to control units of the transportation device.

The receiving unit 42, the movement planner 43 and the transmission unit 46 may be controlled by a control unit 44. As the case may be, settings of the receiving unit 42, the movement planner 43, the transmission unit 46 or the control unit 44 may be changed via a user interface 48. Data accumulating in the device 40 may be stored in a memory 45 of the device 40, if necessary, for example for a later evaluation or for a use by the components of the device 40. The receiving unit 42, the movement planner 43, the transmission unit 46 and the control unit 44 may be realized as dedicated hardware, for example as integrated circuits. However, of course they may partially or fully be combined or implemented as software running on a suitable processor, for example on a GPU or a CPU. The input 41 and the output 47 may be implemented as separate interfaces or as a combined bidirectional interface.

Figure 6:
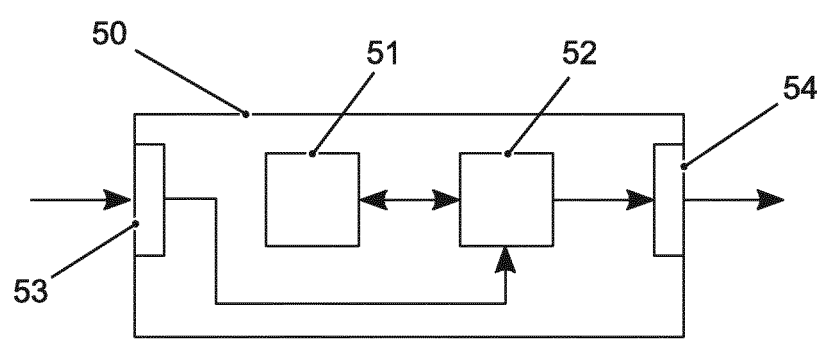
FIG. 6 schematically shows a second embodiment of a device for planning a movement of a transportation device.

FIG. 6 schematically shows a second embodiment of a device 50 for planning a movement of a transportation device. The device 50 comprises a processor 52 and a memory 51. For example, the device 50 is a control unit of a transportation device. Instructions are stored in the memory 51 that, when executed by the processor 52, cause the device 50 to carry out the steps according to one of the procedures described. The instructions stored in the memory 51 thus incorporate a program executable by the processor 52 which implements the method according to the present embodiment. The device 50 comprises an input 53 for receiving information. Data generated by the processor 52 is provided via an output 54. Further, they may be stored in the memory 51. The input 53 and the output 54 may be combined in a bidirectional interface.

The processor 52 may comprise one or more processor units, for example microprocessors, digital signal processors, or combinations thereof.

The memories 45, 51 of the described embodiments may comprise volatile as well as non-volatile storage areas and may comprise a wide variety of storage devices and storage media, for example, hard drives, optical storage media or semiconductor memory.

Figure 7:
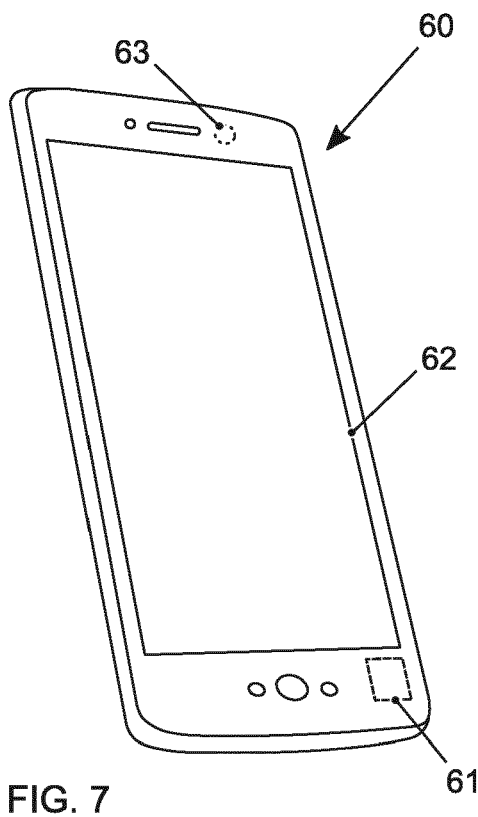
FIG. 7 schematically shows a smartphone for displaying an augmented reality representation.

FIG. 7 schematically shows a smartphone 60 as an example of a mobile device suitable to be used with a method or a device according to the present embodiment.

The smartphone 60 has a display 62 that is arranged to display an augmented reality representation. For this purpose, by a camera 63 the smartphone 60 records an environment which is displayed on the display 62. Information about superimposing the displayed environment on the display 62 is received via an interface 61. In particular, data may be exchanged with a transportation device via the interface 61. The display 62 is designed to be touch-sensitive and serves as an interface for interaction with a user.

Figure 8:
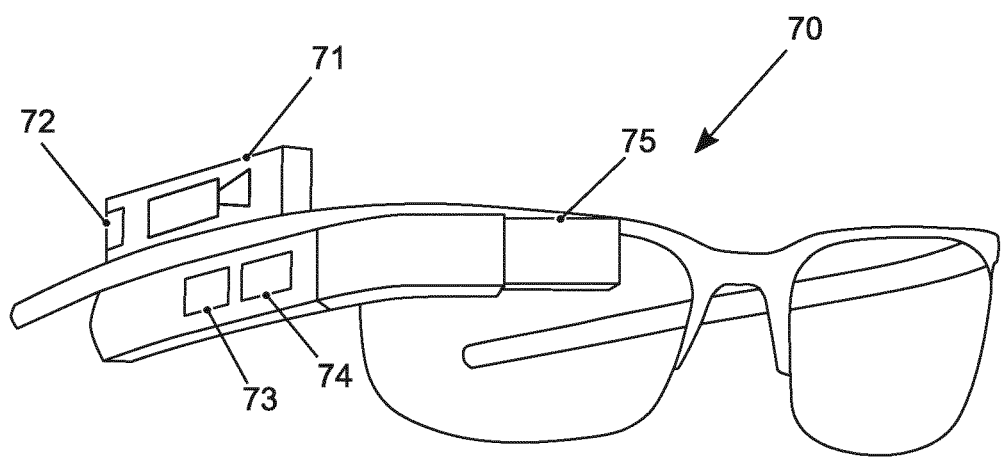
FIG. 8 schematically shows augmented reality glasses.

FIG. 8 schematically shows augmented reality glasses 70 as an example of a mobile device, which is suitable for use with a method or a device according to the present embodiment. The augmented reality glasses 70 comprise a camera 71 for detecting environmental data of an environment of the augmented reality glasses. A pose of the augmented reality glasses may be determined by means of a pose determination device 72, for example based on the environmental data. In accordance with the determined pose a graphics unit 73 generates a representation for the augmented reality glasses. For this purpose, the pose determination device 72 and the graphics unit 73 may exchange data with each other. Information about content to be displayed is received via an interface 74. In particular, data exchange with a transportation device may take place via the interface 74. The graphics unit 73 The representation generated by the graphics unit 73 is displayed by a projection unit 75. In the example in FIG. 8 a monocular display is used, i.e. in front of only one eye of the user a display is arranged. Of course, the solution described herein may also be used with augmented reality glasses with a binocular display with one display per eye or with a binocular display where both eyes have a common display. The interaction with the user may performed by using voice commands or by using an additional input device.

Figure 9:
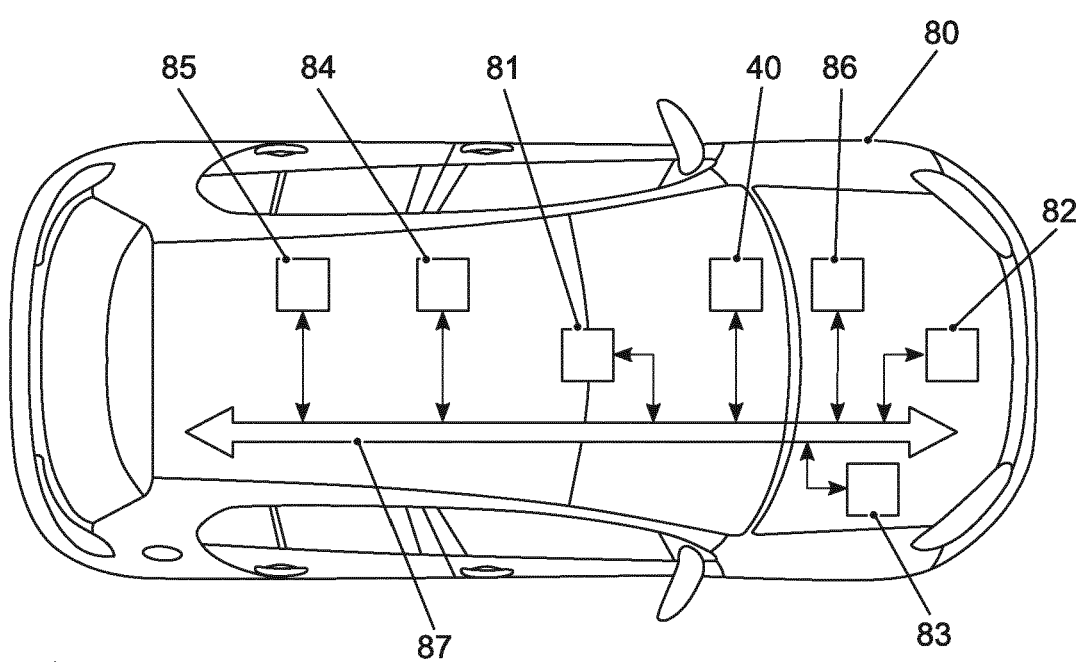
FIG. 9 schematically shows an exemplary motor vehicle in which an embodiment according to the teachings herein is realized.

FIG. 9 schematically shows a transportation device 80 in which a solution according to the present embodiment is realized. In this example, the transportation device 80 is a motor vehicle. The motor vehicle comprises an imaging sensor 81, for example a camera. Further, a radar sensor 82 and a lidar sensor 83 are present. Further components of the motor vehicle are a navigation device 84 and a data transmission unit 85. By means of the data transmission unit 85, a connection to a mobile device or to a service provider may be established, especially for exchange of information for the planning of movement. The data of the various sensors 81, 82, 83 as well as information received by the data transmission unit 85 for the planning of movement are considered by a device 40 according to the present embodiment when planning the movement of the motor vehicle. A memory 86 is provided for storing data. The data exchange between the various components of the motor vehicle takes place via a network 87.

Figure 10:
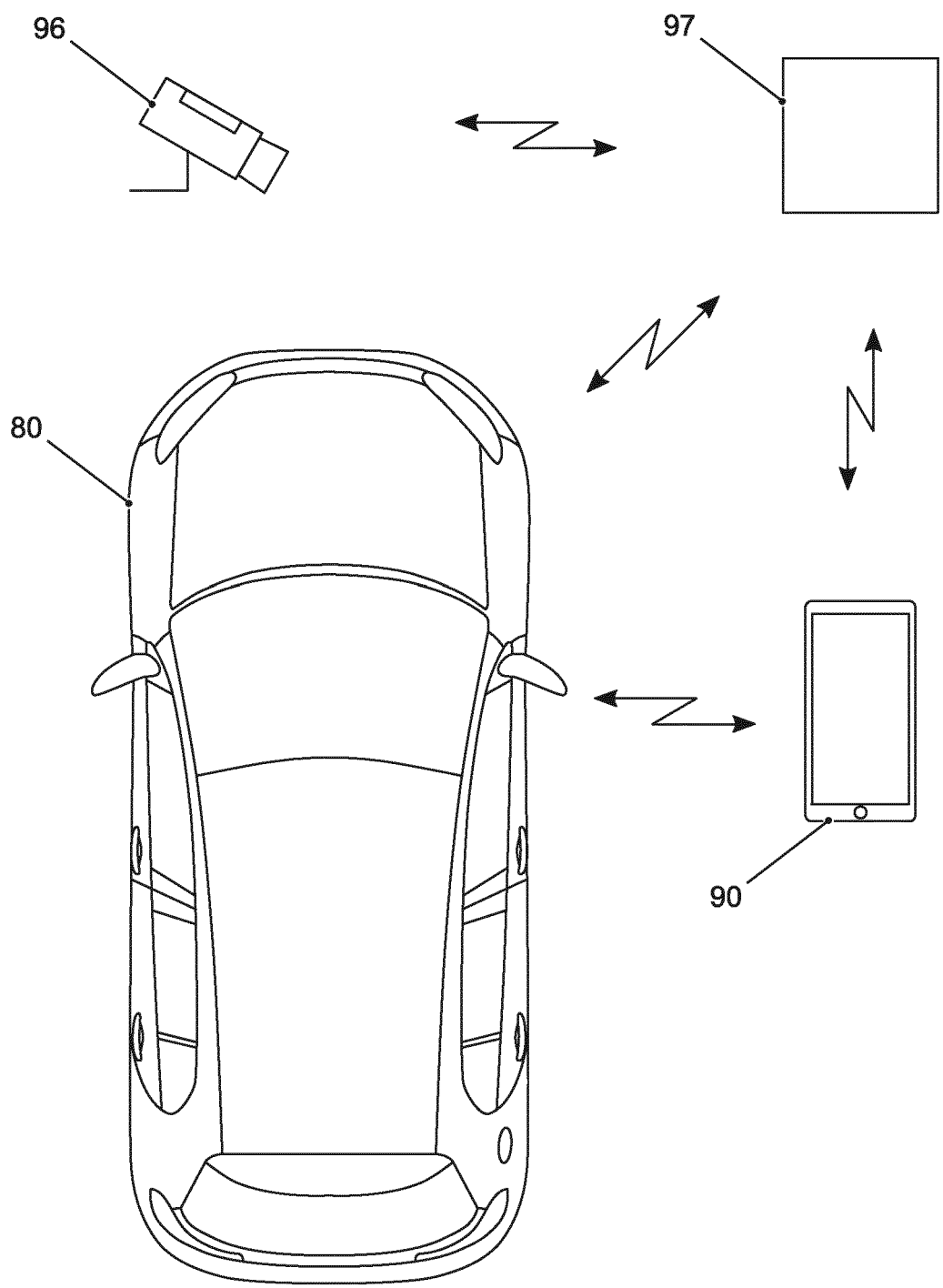
FIG. 10 schematically shows an exemplary diagram of a system of the embodiment.

FIG. 10 schematically shows a system diagram of the solution according to the present embodiment. There are shown the transportation device 80, here in the form of a motor vehicle, and the mobile device 90, which exchange data over a communication link. Additionally, there are shown a further sensor 96 in the form of an observation camera and a backend 97. According to the previous description the monitoring and the planning of the movement were performed by using the sensor technology present in the mobile device 90 or in the transportation device 80, the sensor data recorded there and the computing capacity available there.

An extension is possible if a backend 97 is available as a wireless data connection. With the help of such a backend, sensors of other nearby vehicles, mobile devices, or permanently installed sources 96 may be made available to the mobile device 90 or the transportation device 80 as a data source. The augmentation or the trajectory is then computed based on the own and foreign sensor data. To prevent harmful attack scenarios, the communication for example is encrypted and provided with a unique time stamp for each data packet.

If the environmental data of the own mobile device 90 and, as the case may be, of the means of transport 80 are not sufficient, e.g. due to the camera image being covered by a pillar, environmental data stored in the backend 97 may be used for tracking or object recognition. For this, for example a time stamp for each date stored in the backend 97 has to be provided so that it may be decided whether this data may or may not serve as a source for each application.

Data that were delivered at other times by mobile devices or transportation device to the backend 97, may be provided as an additional alternative to the user by means of an augmentation so that an added value is offered for the user. An example of this is information like "In the parking space you chose today there were already parking X people" or "The vehicle parking three spaces to the left of you usually leaves in 5 minutes". Thereby, of course, data protection has to be ensured.

Figure 11:
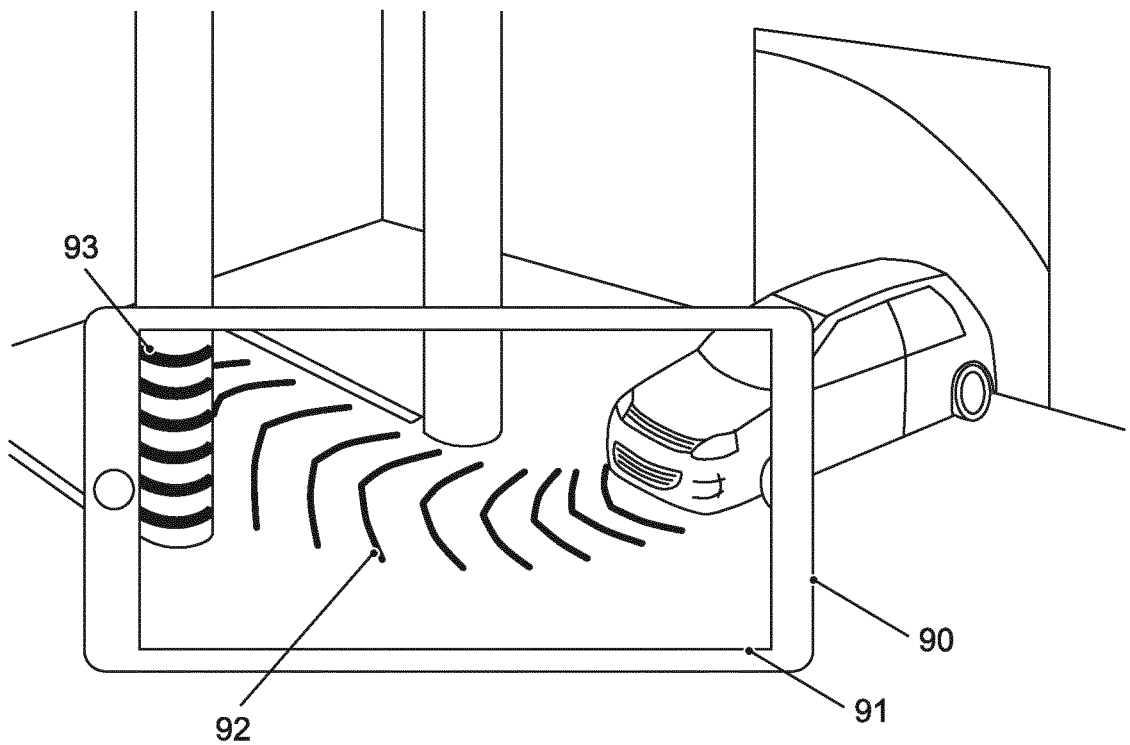
FIG. 11 illustrates an example of a visualization of a trajectory and of objects recognized by sensors in the form of an augmented reality representation.

FIG. 11 illustrates a visualization of a trajectory 92 and of objects 93 recognized by sensors in the form of an augmented reality representation on a display unit 91 of a mobile device 90. In this manner, an outside standing person, for example a driver having left, may understand the actions of an automatically driving vehicle and intervene for correction. In this manner, the actions of a manually driving person may also be traced from the outside, for example use a probably route of the the current steering wheel angle and for example, for a more precise instruction.

FIGS. 12 to 15 illustrate the active influence of a user on the planning of a movement, here using the example of a motor vehicle. The user directs the camera of his mobile device onto the vehicle and works with the augmented representations or generates them. Only displayed content is shown on the display unit of the mobile device.

Figure 12:
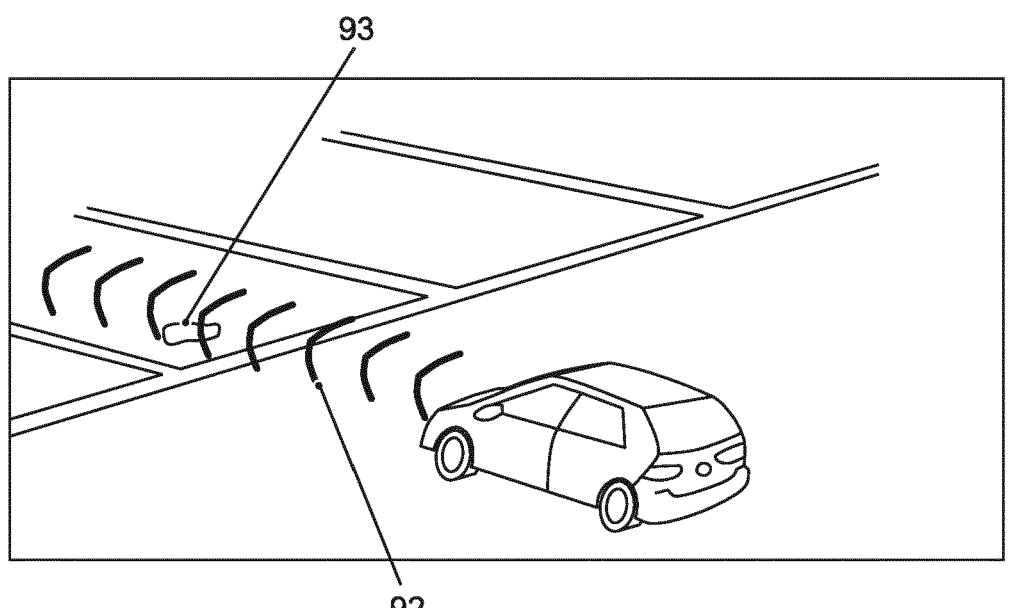
FIG. 12-15 illustrate examples of an active influence of a user on the movement planning.

FIG. 12 shows the planned trajectory 92 of a vehicle in the direction of a parking area. In the parking area there is an obstacle 93 in the form of a pothole, which has not yet been recognized by the sensor system of the vehicle.

Figure 13:
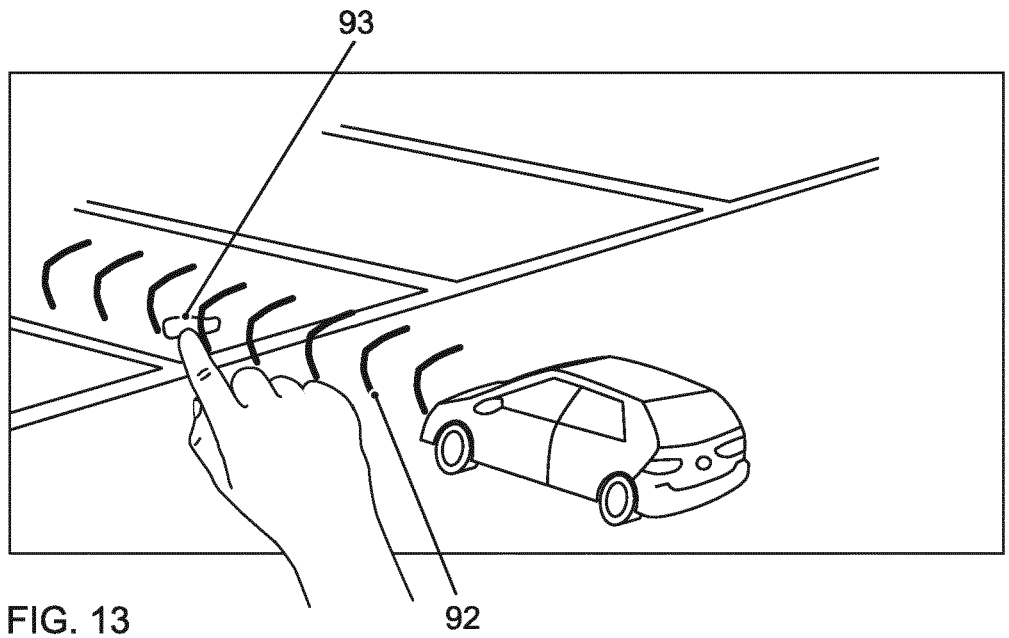

In FIG. 13, the user marks the pothole with his finger on the camera image of the mobile device. The corresponding information is then transmitted from the mobile device to the vehicle, which may now consider the identified pothole in the planning of the movement. Unless the selected element after having been manually selected is automatically recognized, the user for his part may perform an assignment of meaning.

Figure 14:
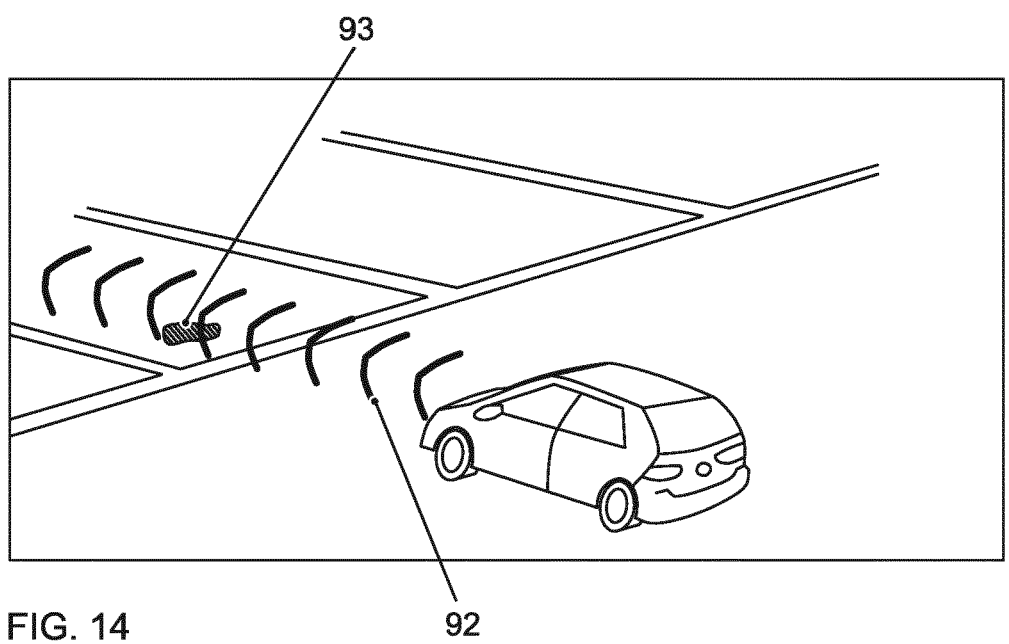
Figure 15:
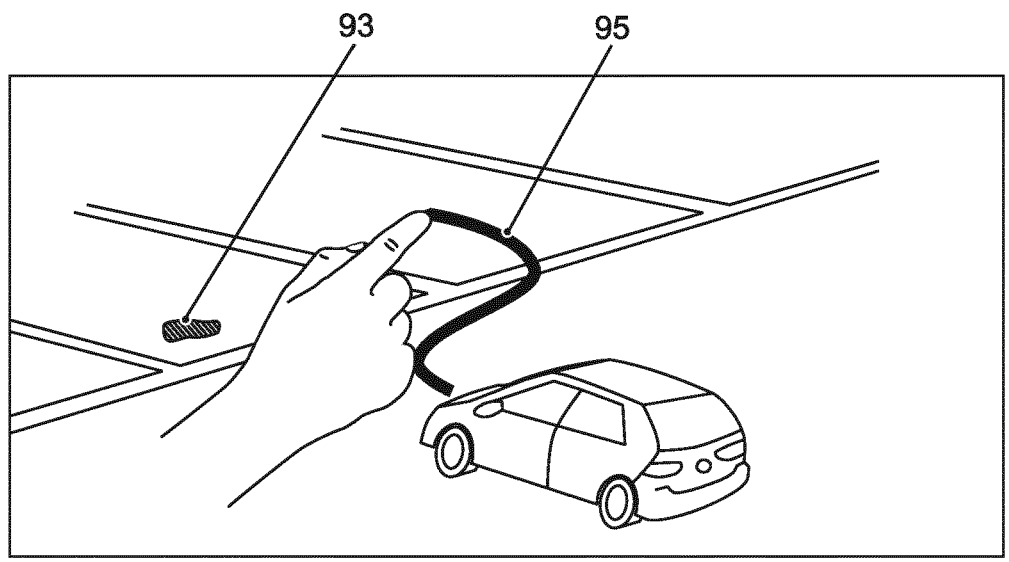

FIG. 14 shows that the pothole has been recognized by the vehicle as an obstacle 93. In the specific example, however, the movement planned by the movement planner was not changed as the pothole had not been considered a problematic obstacle 93. The user would therefore like to assign a route to the vehicle himself. For this task, which is shown in FIG. 15, in a first step the user may draw a simple path 95 with the finger on the camera image of the mobile device. In a second step, this path may then be checked by the corresponding path planning unit of the transportation device and be implemented in an executable proposal. For this purpose, for example a new and improved augmented representation reflecting the actual capabilities of the vehicle is provided. After an optional third step, the confirmation, this new path then is driven.

LIST OF REFERENCE NUMERALS

10 Receiving information about a trajectory of a transportation device
11 Show the trajectory as an augmented reality representation
12 Detecting input from a user
13 Transmission of information about the user's input to the transportation device
15 Transmission of information about a trajectory of the transportation device
16 Receiving of information for influencing the trajectory
17 Planning of the movement of the transportation device
20 Device
21 Input
22 Receiving unit
23 Graphics unit
24 Control unit
25 Storage
26 Transmission unit
27 Output
28 User interface
30 Device
31 Storage
32 Processor
33 Input
34 Output
40 Device
41 Input
42 Receiving unit
43 Movement planner
44 Control unit
45 Storage
46 Transmission unit
47 Output
48 User interface
50 Device
51 Storage
52 Processor
53 Input
54 Output
60 Smartphone
61 Interface
62 Display
63 Camera
70 Augmented reality glasses
71 Camera
72 Interface
73 Pose determination device
74 Graphics unit
75 Projection unit
80 Transportation device
81 Imaging sensor
82 Radar sensor
83 Lidar sensor
84 Navigation device
85 Data transmission unit
86 Storage
87 Network
90 Mobile device
91 Display unit
92 Trajectory
93 Obstacle
94 Target point
95 Path
96 Sensor
97 Backend The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for monitoring a movement of a transportation device, comprising:
   receiving information about a trajectory of the transportation device;
   displaying the trajectory on a display of a mobile device in form of an augmented reality representation;
   detecting an input of a user of the mobile device for influencing the trajectory; and
   transmitting information to the transportation device on basis of the input of the user.

2. The method of claim 1, wherein the mobile device receives and displays on the display information about obstacles, which are detected by a sensor system of the transportation device.

3. The method of claim 2, wherein the input of the user determines a destination for the transportation device, a path for the transportation device, or an information about an obstacle.

4. The method of claim 2, wherein environmental information detected by the mobile device is transmitted to the transportation device.

5. The method of claim 1, wherein the input of the user determines a destination for the transportation device, a path for the transportation device, or an information about an obstacle.

6. The method of claim 5, wherein the user marks an obstacle on the display or classifies a marked obstacle.

7. The method of claim 6, wherein environmental information detected by the mobile device is transmitted to the transportation device.

8. The method of claim 5, wherein environmental information detected by the mobile device is transmitted to the transportation device.

9. The method of claim 1, wherein environmental information detected by the mobile device is transmitted to the transportation device.

10. A method for planning a movement of a transportation device, comprising:
    transmitting information about a trajectory of the transportation device to a mobile device;
    receiving of information for influencing the trajectory from the mobile device based on input from a user of the mobile device; and
    planning the movement of the transportation device on the basis of at least the received information.

11. The method of claim 10, wherein, during planning the movement, the transportation device receives and considers environmental information detected by the mobile device or information from other sources.

12. A non-transitory computer-readable storage medium with instructions that, when executed by a computer, cause the computer to:
- receive information about a trajectory of a transportation device;
- display the trajectory on a display of a mobile device in form of an augmented reality representation;
- detect an input of a user of the mobile device for influencing the trajectory; and
- transmit information to the transportation device on basis of the input of the user.

13. A device for monitoring a movement of a transportation device, comprising:
- a receiving unit for receiving information about a trajectory of the transportation device;
- a graphics unit for generating a representation of the trajectory on a display of a mobile device in the form of an augmented reality representation;
- a user interface for detecting an input of a user of the mobile device for influencing the trajectory; and
- a transmission unit for transmitting information to the transportation device based on the input of the user.

14. A device for planning a movement of a transportation device, comprising:
- a transmission unit for transmitting information about a trajectory of the transportation device to a mobile device;
- a receiving unit for receiving information for influencing the trajectory from the mobile device based on an input of a user of the mobile device; and
- a movement planner for planning the movement of the transportation device based on at least the received information.

15. A transportation device, wherein the transportation device comprises a device comprising:
- a transmission unit for transmitting information about a trajectory of the transportation device to a mobile device;
- a receiving unit for receiving information for influencing the trajectory from the mobile device based on an input of a user of the mobile device; and
- a movement planner for planning the movement of the transportation device based on at least the received information.

16. A non-transitory computer-readable storage medium with instructions that, when executed by a computer, cause the computer to:
- transmit information about a trajectory of the transportation device to a mobile device;
- receive information for influencing the trajectory from the mobile device based on input from a user of the mobile device; and
- plan movement of the transportation device on the basis of at least the received information.

17. A transportation device, wherein the transportation device is configured to perform:
- transmitting information about a trajectory of the transportation device to a mobile device;
- receiving of information for influencing the trajectory from the mobile device based on input from a user of the mobile device; and
- planning the movement of the transportation device on the basis of at least the received information.

* * * * *